Dec. 18, 1923.
S. W. McCULLOUGH
1,477,655
CONVERTIBLE WIND AND GLARE SHIELD
Filed Oct. 9, 1922
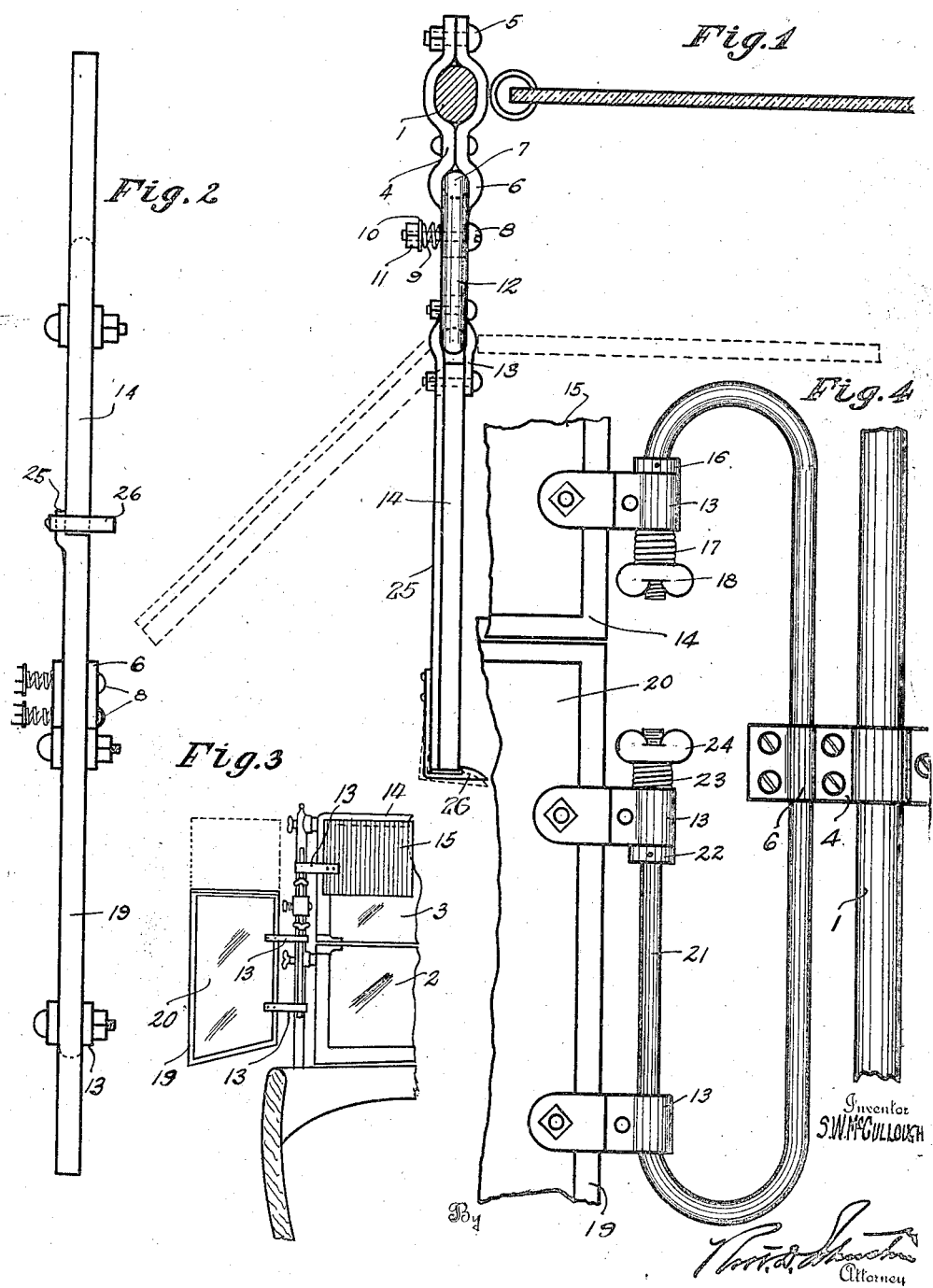
Inventor
S. W. McCULLOUGH
Attorney Patented Dec. 18, 1923.

1,477,655

UNITED STATES PATENT OFFICE.

SAMUEL W. McCULLOUGH, OF BIRMINGHAM, ALABAMA.

CONVERTIBLE WIND AND GLARE SHIELD.

Application filed October 9, 1922. Serial No. 593,437.

*To all whom it may concern:*

Be it known that I, SAMUEL W. McCUL-LOUGH, a citizen of the United States of America, residing at Birmingham, in the county of Jefferson and State of Alabama, have invented certain new and useful Improvements in Convertible Wind and Glare Shields, of which the following is a specification.

My invention relates to an auxiliary wind guard or shield attachment adapted to function as a glare shield.

My invention more particularly relates to improvements in a wind guard adapted to be so attached to a side of the wind shield frame that it can be swung into the path of vision to form a glare shield.

My invention contemplates the manufacture of such wind guard in upper and lower sections and the mounting in the upper section of glass or like translucent material which is capable of intercepting the light rays of an approaching automobile's headlight sufficiently to form a glare shield.

My invention contemplates so mounting the upper wind guard section that it can be swung over behind the wind shield and into the line of vision of the driver when required to function as a glare shield and which can be readily swung back to normal operating position to resume its function as a wind guard.

My invention further comprises the novel details of construction and arrangements of parts, which in their preferred embodiment only are hereinafter more particularly described and claimed, it being understood that the construction shown may be variously modified without departing from the substance of my invention.

As illustrated in the drawings:—

Fig. 1 shows a plan view of the wind guard with its upper and lower sections shown in dotted lines in different operating positions, the wind shield and its frame being shown in horizontal cross-section.

Fig. 2 is an end elevation of my combination wind and glare shield.

Fig. 3 is a fragmental view looking towards the wind shield from the rear and showing the lower section operating as a wind guard and the upper section as a glare shield.

Fig. 4 is an enlarged detail view of a preferred means for pivotally mounting the convertible wind and glare shield.

Similar reference numerals refer to similar parts throughout the drawings.

I have shown my invention applied to the frame 1 of an automobile wind shield comprising a lower section 2 and an upper section 3, all of which may be of any standard construction. I mount on the frame 1 several clamps 4 which are caused to rigidly engage the frame by screws 5 and which have at their rear ends opposed bends 6 which are adapted to receive and clamp the wind guard support bar or rod 7 which has a rounded cross-section where received between the bends 6. The rear ends of the clamp sections are yieldingly drawn together by a bolt 8 having a coil spring 9 interposed between its washer 10 and nut 11, this arrangement forming a spring clamp which permits of the angular adjustment of the support rod 7 about its vertical axis. The upper end 12 of the support rod is bent over and downwardly and has mounted thereon a clamp bracket 13 connected to the frame section 14 of the upper wind and glare shield 15. The use of a frame about this shield 15 is optional. This clamp bracket 13 is mounted between a collar 16 on one side and a coil spring 17 on the other side, which latter is forced against the clamp by a wing nut 18. As shown, only a single bracket 13 is provided for the upper shield 15 but any desired number may be used. In like manner the frame 19 of the lower wind guard 20 is connected by clamps 13 to the lower upturned end 21 on the support bar. The upper clamp is mounted between a collar 22 and a spring 23 held to its work by a wing nut 24. This arrangement affords a suitable anti-rattling mounting which will hold the auxiliary wind and glare shield elements 15 and 20 in any desired adjusted positions as the same are swung horizontally about the support but which may be raised to meet different operating conditions. The upper wind and glare shield 15 is formed of orange or anti-glare resisting translucent material such as glass, isinglass, or celluloid, or any combination of the same. The lower wind guard is made of ordinary transparent glass 20. The upper cross member of the frame 19 has along its forward edge a raised flange 25 against which the wind and glare shield 14 is adapted to be swung and to be engaged by a spring latch 26 which serves to hold the upper and lower sections 15 and 20 together. By releasing the latch 26 the upper glare shield section 15 can be swung horizontally rearwardly and inwardly until it interposes its glare resisting translucent body 15 in the line of vision forming an effective glare shield which the driver can use so long as desired and which he can readily swing outwardly against the flange 25 when not desired and the latch 26 will automatically catch and hold it in such position. When the two sections of the wind guard are clamped together they perform every function of the present styles of wind guard attachments which are now in general use but by releasing the latch 26 the glare shield section can be swung into the line of vision, leaving the lower section serving as a wind guard and the upper section as a glare shield. The easy way in which the device can be converted from wind to glare shield and vice versa is its most distinguishing characteristic.

Though I have described with great particularity the details of the embodiment of the invention herein shown, it is not to be construed that I am limited thereto, as changes in arrangement and substitution of equivalents may be made by those skilled in the art without departing from the invention as defined in the appended claims.

Having thus described my invention, what I claim as new and desire to secure by Letters Patent, is:—

1. A wind guard attachment comprising upper and lower sections, the upper section having translucent glare resisting material mounted therein, and means to mount said sections to permit the upper section to be moved into the line of vision of the driver.

2. A convertible wind guard and glare shield comprising a bracket for its attachment to the vehicle, a lower clear glass guard section horizontally adjustable on the bracket, and an upper wind guard section having a translucent glare resisting body member therein, and means to mount said upper section free to be swung into the path of vision of the driver.

3. A convertible wind guard and glare shield as described in claim 2, in which the lower section comprises a stop and latch to engage and connect the upper section thereto.

4. A convertible wind guard and glare shield in accordance with claim 2, in which each section has independent friction grip elements mounting it on its bracket and adapted yieldingly to hold it in adjusted positions.

In testimony whereof I affix my signature.

SAMUEL W. McCULLOUGH.

Witness:
   NOMIE WELSH.